Oct. 16, 1928.
J. W. WELSH
1,687,960
METHOD OF MAKING OPHTHALMIC MOUNTINGS
Filed April 29, 1926
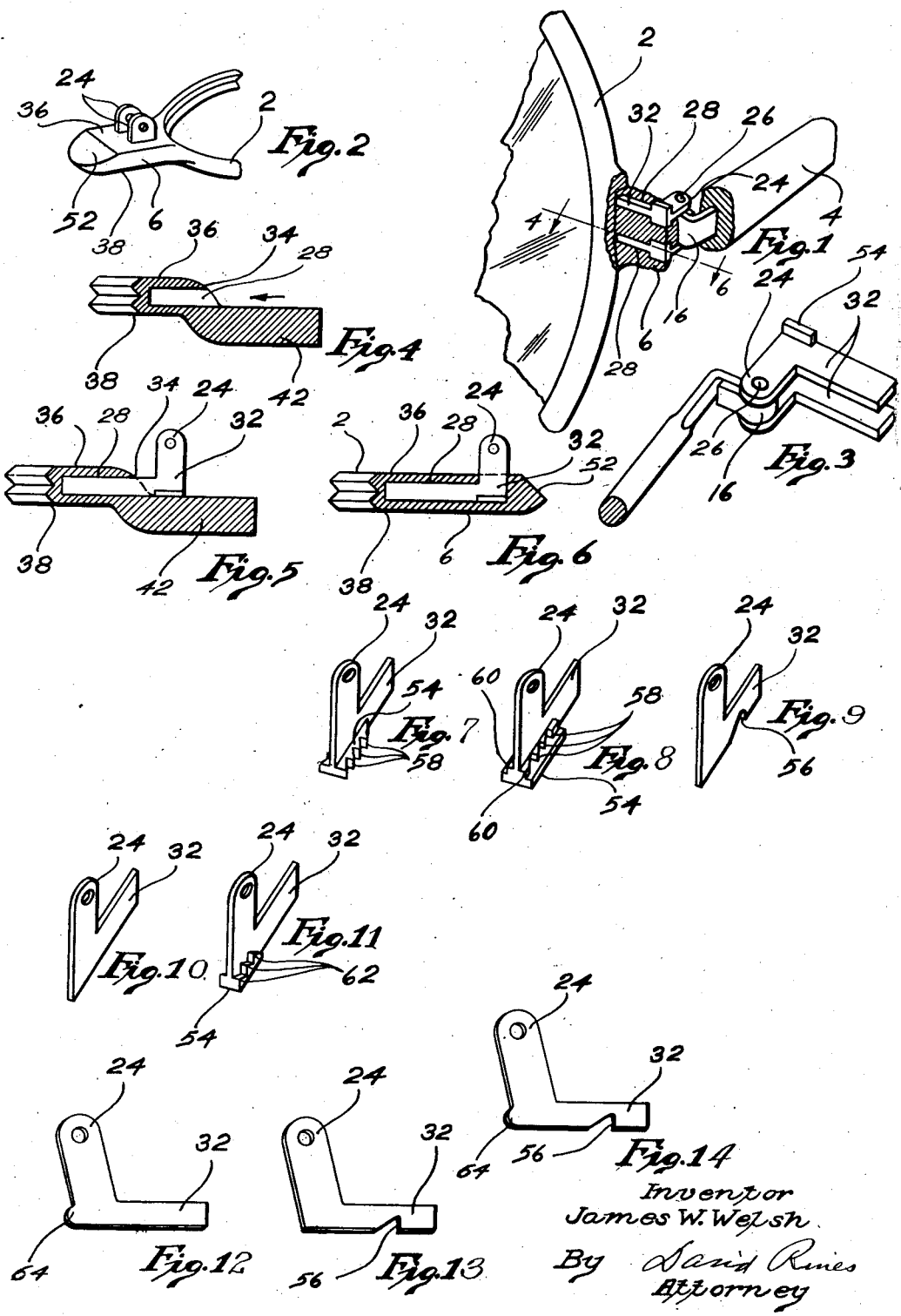
Inventor
James W. Welsh
By David Rines
Attorney Patented Oct. 16, 1928.

1,687,960

UNITED STATES PATENT OFFICE.

JAMES W. WELSH, OF PROVIDENCE, RHODE ISLAND, ASSIGNOR TO BAUSCH & LOMB OPTICAL COMPANY, OF ROCHESTER, NEW YORK, A CORPORATION OF NEW YORK.

METHOD OF MAKING OPHTHALMIC MOUNTINGS.

Application filed April 29, 1926. Serial No. 105,466.

The present invention relates to methods of making ophthalmic mountings, particularly mountings of the non-metal type. The present application is a continuation in part of application Serial No. 735,989, filed September 5, 1924, and is filed in response to a requirement for division.

The chief object of the invention is to improve upon present-day hinge connections between the fronts and the temples of ophthalmic mountings of the above-described character. Other objects will appear hereinafter.

In the accompanying drawings, Fig. 1 is a fragmentary perspective view, partly in section, of an ophthalmic mounting constructed according to a preferred embodiment of the present invention; Fig. 2 is a similar fragmentary perspective, illustrating more particularly an end piece of a lens-holding frame constructed in accordance with the present invention; Fig. 3 is a similar fragmentary perspective showing hinge plates connected to a spectacle-temple reinforcing core; Figs. 4, 5 and 6 are sections taken upon the line 4—6 of Fig. 1, looking in the direction of the arrows, illustrating successive steps in the method of the present invention; Figs. 7 to 11 inclusive are perspective views of modified hinge plates; Fig. 12 is an enlarged perspective of a preferred hinge plate; and Figs. 13 and 14 are similar views of modifications.

Non-metal mountings of the character illustrated in the drawings are usually constituted of a non-metal front or lens-holding frame 2 and non-metal temples 4. The temples are hinged at their forward ends 16 to end pieces 6 of the front 2. The illustrative temple is provided with a novel reinforcing rod, but will not be further described herein, as other temples may be used without departing from the spirit and scope of the present invention. A full description of the illustrative temple may be found in a co-pending application, Serial No. 735,990, filed September 5, 1924.

The end piece 6 of the front 2 is provided with a plurality of grooves 28 (two are shown) in each of which is seated a comparatively thin hinge element 32, as shown more particularly in Fig. 1. Each hinge element 32 is provided with a body portion that is mounted in the end piece and an eye 24 extending beyond a face 36 of the end piece. The eyes 24 are in alinement, and a pintle 26 extends through the eyes 24 of the hinge elements pivotally to connect the temple and the hinge elements together.

According to the preferred method of manufacturing the above-described mounting, the greater portion of the end piece 6 is preferably first heated, and is then deformed, as by bending, swaging, or other forcing action, out of the plane of the mounting, as is illustrated more particularly in Figs. 4 and 5, so as to expose an inner portion 34 of the end piece along the direction of its thickness. The grooves 28 are then preferably cut longitudinally into the end piece, in its heated condition, at the inner exposed portion 34 thereof, between the faces 36 and 38. The body portions of the metal hinge elements 32 may now be forced longitudinally into the end piece, in a direction parallel to the faces 36 and 38 thereof, in the direction of the arrow. The position of one of the hinge plates, after it is mounted in place, with the eye 24 projecting beyond the groove 28, is illustrated in Fig. 5. The deformed portion 42 of the end piece 6 is now forced back into its original form, illustrated in Figs. 2 and 6, completing the operation.

The thinness of the hinge elements 32 readily adapts them to the above-described method; and because of this thinness, it is desirable to employ a plurality of hinge elements to each hinge, mounted side by side on the end piece, as illustrated. Non-metal material of the nature under discussion, like zylonite and the like, has a tendency to retain its original shape, and to return to such shape if deformed. Once the non-metal material has been restored to its initial position, therefore, there will be no tendency to further deformation and it will securely hold the hinge elements in place.

After the lens-holding front has been manufactured as above described, it may be beveled off, as shown at 52, the beveled portion being adapted to cooperate with a corresponding beveled portion (not shown) upon the temple. The beveling is not, however, necessary. The mounting may be finished in other ways also a description of which is not essential to an understanding of the present invention.

The body portions of the hinge plates may be provided with shoulders 54 extending longitudinally thereof beyond the planes of the metal plates of which the hinge elements are constituted. The use of such shoulders increases the anchoring effect of the hinge plate in the non-metal material. The shoulder may extend throughout the length of the body portion, but the above-described method of assembly is more easily carried out, in practice, if they extend but part way from near the eye portion 24, as illustrated in Figs. 1, 3, 7, 8 and 11. The shoulders 54 may, however, be dispensed with, as shown in Fig. 10, the whole body and the eye 24 being in the plane of the metal plate of the hinge element, and a tooth 56 or other biting projection may be provided thereon, as illustrated in Figs. 9 and 13, to provide for a more firm securing action of the hinge element in the non-metal material. Or, the hinge plate may be provided with a shoulder or lug 64 that projects longitudinally thereof in the plane of the hinge plate, in a direction opposite to the direction of extension of the body portion, as shown in Figs. 12 and 14. These shoulders or lugs 64, like the shoulders 54, increase the anchoring effect of the hinge plate in the non-metal material, but do not interfere with the driving of the hinge plate into a groove 28.

Of course, the shoulder 54 may also be provided with a biting portion or portions, as illustrated at 58. The biting portions 58 may be provided upon the shoulder 54, or upon a second shoulder 60. The biting portions 58 may extend outward beyond the shoulder, as illustrated in Fig. 7, or they may be confined within the limits of the shoulder, and extend to the body portion, as indicated at 62 in Fig. 11.

In Figs 12, 13 and 14, the eye 24 is shown slanting in the direction of the lug 64, as is explained in a copending application, Serial No. 103,173, filed April 19, 1926.

A mounting contructed in accordance with the present invention is most efficient, and besides being easy and cheap to manufacture, it is of pleasing appearance, no metal parts being visible when the mounting is viewed from the front.

Further modifications will readily occur to persons skilled in the art, and all such are considered to be embraced within the spirit of the invention as defined in the appended claims. It is desired that the appended claims be construed as of a scope such as to cover all the novelty that the invention may possess.

What is claimed is:

1. A method of making an article of the class described that comprises deforming a member so as to expose an inner previously unexposed portion thereof along the direction of the thickness of the member, inserting a second member in the exposed portion of the deformed member, and restoring the deformed member to its original form.

2. A method of making an ophthalmic mounting that comprises deforming a non-metal mounting so as to expose an inner previously unexposed portion thereof along the direction of the thickness of the mounting, inserting a metal member in the exposed portion of the mounting, and restoring the deformed mounting to its orignal form.

3. A method of making an opthalmic mounting that comprises forcing a portion of an end piece of non-metal mounting out of the plane of the mounting so as to expose an inner previously unexposed portion of the end piece along the direction of the thickness of the mounting, inserting a hinge plate in the exposed portion of the end piece, and restoring the deformed end piece to its original form.

4. A method of making an opthalmic mounting that comprises forcing a portion of an end piece of a non-metal mounting out of the plane of the mounting so as to expose an inner previously unexposed portion of the end piece along the direction of the thickness of the mounting, cutting an opening into the mounting at the exposed portion of the end piece between the faces of the mounting, inserting the body portion of a hinge plate provided with a projecting eye into the opening so as to cause the eye to project beyond the opening, and restoring the deformed end piece to its original form.

5. A method of making an opthalmic mounting that comprises forcing a portion of an end piece of a non-metal mounting out of the plane of the mounting so as to expose an inner portion of the end piece along the direction of the thickness of the mounting, inserting the body portion of a hinge plate provided with an intermediately disposed eye in the exposed portion of the end piece, the body portion and the eye being in the plane of the plate, and restoring the deformed end piece to its original form to cause the remainder of the body portion to become embedded in the end piece.

6. A method of making an ophthalmic mounting that comprises forcing a portion of an end piece of a non-metal mounting out of the plane of the mounting so as to expose an inner portion of the end piece along the direction of the thickness of the mounting, cutting an opening into the mounting at the exposed portion of the end piece between the faces of the mounting, inserting the body portion of a hinge plate provided with a projecting eye into the opening so as to cause the eye to project beyond the opening, the hinge plate being provided with a lug projecting from the eye in a direction away from the body portion, and the body portion, the eye and the lug being in the plane of the plate, and restoring the deformed end piece to its orignal form to cause the lug to become embedded in the end piece.

In testimony whereof, I have hereunto subscribed my name.

JAMES W. WELSH.